(12) United States Patent
Ying et al.

(10) Patent No.: US 8,009,883 B2
(45) Date of Patent: Aug. 30, 2011

(54) METHOD OF AND SYSTEM FOR AUTOMATIC OBJECT DISPLAY OF VOLUMETRIC COMPUTED TOMOGRAPHY IMAGES FOR FAST ON-SCREEN THREAT RESOLUTION

(75) Inventors: Zhengrong Ying, Wakefield, MA (US); Kyle Guilbert, Cambridge, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 924 days.

(21) Appl. No.: 11/704,482

(22) Filed: Feb. 9, 2007

(65) Prior Publication Data
US 2008/0193002 A1 Aug. 14, 2008

(51) Int. Cl.
*G06K 9/00* (2006.01)
(52) U.S. Cl. .......................... 382/128; 382/131; 382/132
(58) Field of Classification Search .................. 382/131, 382/141
See application file for complete search history.

(56) References Cited

U.S. PATENT DOCUMENTS

| | | | |
|---|---|---|---|
| 4,029,963 A | 6/1977 | Alvarez et al. |
| 4,759,047 A | 7/1988 | Donges et al. |
| 4,884,289 A | 11/1989 | Glockmann et al. |
| 5,132,988 A | 7/1992 | Fisher et al. |
| 5,132,998 A | 7/1992 | Tsutsui et al. |
| 5,182,764 A | 1/1993 | Peschmann et al. |
| 5,247,561 A | 9/1993 | Kotowski |
| 5,319,547 A | 6/1994 | Krug et al. |
| 5,367,552 A | 11/1994 | Peschmann et al. |
| 5,473,657 A | 12/1995 | McKenna |
| 5,661,774 A | 8/1997 | Gordon et al. |
| 5,802,134 A | 9/1998 | Larson et al. |
| 5,870,449 A | 2/1999 | Lee et al. |
| 5,881,122 A | 3/1999 | Crawford et al. |
| 5,887,047 A | 3/1999 | Crawford et al. |
| 5,901,198 A | 5/1999 | Crawford et al. |
| 5,909,477 A | 6/1999 | Crawford et al. |
| 5,932,874 A | 8/1999 | Legg et al. |

(Continued)

FOREIGN PATENT DOCUMENTS
DE  3150306 A1  6/1983

OTHER PUBLICATIONS

Alvarez, Robert e. et al.; Energy-selective Reconstructions in X-ray Computerized Tomography; Phys. Med. Biol.: 21(5):733-744 (1976).

(Continued)

*Primary Examiner* — Tom Y Lu
(74) *Attorney, Agent, or Firm* — McDermott Will & Emery LLP

(57) ABSTRACT

A method of and a system for automatic object display of volumetric CT data for fast on-screen threat resolution are disclosed, wherein the CT data includes a CT image in a single energy CT scanner, or a CT image and a Z image in a multi-energy CT scanner, and a label image defining each object as a plurality of voxels of the volumetric CT data. The method comprises generating volumetric CT image data corresponding to a scanned bag; performing automatic threat detection to generate a label image; processing the volumetric CT data and the label image to obtain visualization parameters for each object; automatically generating display images for each object using corresponding visualization parameters; and displaying the generated display images for on-screen threat resolution.

28 Claims, 10 Drawing Sheets

U.S. PATENT DOCUMENTS

| | | | |
|---|---|---|---|
| 5,937,028 A | 8/1999 | Tybinkowski et al. | |
| 5,949,842 A | 9/1999 | Schafer et al. | |
| 5,970,113 A | 10/1999 | Crawford et al. | |
| 5,982,843 A | 11/1999 | Bailey et al. | |
| 5,982,844 A | 11/1999 | Tybinkowski et al. | |
| 6,026,143 A | 2/2000 | Simanovsky et al. | |
| 6,026,171 A | 2/2000 | Hiraoglu et al. | |
| 6,035,014 A | 3/2000 | Hiraoglu et al. | |
| 6,067,366 A | 5/2000 | Simanovsky et al. | |
| 6,075,871 A | 6/2000 | Simanovsky et al. | |
| 6,076,400 A | 6/2000 | Bechwati et al. | |
| 6,078,642 A | 6/2000 | Simanovsky et al. | |
| 6,091,795 A | 7/2000 | Schafer et al. | |
| 6,108,396 A | 8/2000 | Bechwati et al. | |
| 6,111,974 A | 8/2000 | Hiraoglu et al. | |
| 6,128,365 A | 10/2000 | Bechwati et al. | |
| 6,195,444 B1 | 2/2001 | Simanovsky et al. | |
| 6,256,404 B1 | 7/2001 | Gordon et al. | |
| 6,272,230 B1 | 8/2001 | Hiraoglu et al. | |
| 6,317,509 B1 | 11/2001 | Simanovsky et al. | |
| 6,345,113 B1 | 2/2002 | Crawford et al. | |
| 6,554,430 B2 | 4/2003 | Dorval et al. | |
| 6,687,326 B1 | 2/2004 | Bechwati et al. | |
| 6,721,387 B1 | 4/2004 | Naidu et al. | |
| 6,748,043 B1 | 6/2004 | Dobbs | |
| 6,813,374 B1 | 11/2004 | Karimi et al. | |
| 7,031,430 B2 * | 4/2006 | Kaucic et al. | 378/57 |
| 7,136,450 B2 | 11/2006 | Ying et al. | |
| 7,136,451 B2 | 11/2006 | Naidu et al. | |
| 7,190,757 B2 | 3/2007 | Ying et al. | |
| 7,197,172 B1 | 3/2007 | Naidu et al. | |
| 2005/0238232 A1 | 10/2005 | Ying et al. | |
| 2005/0271293 A1 | 12/2005 | Ying et al. | |
| 2005/0276468 A1 | 12/2005 | Ying et al. | |
| 2006/0002585 A1 | 1/2006 | Larson et al. | |
| 2006/0023844 A1 | 2/2006 | Naidu et al. | |
| 2006/0039599 A1 | 2/2006 | Deykoon et al. | |
| 2006/0274066 A1 | 12/2006 | Ying et al. | |
| 2007/0014471 A1 | 1/2007 | Simanovsky et al. | |
| 2007/0014472 A1 | 1/2007 | Ying et al. | |
| 2007/0031036 A1 | 2/2007 | Naidu et al. | |

OTHER PUBLICATIONS

Lehmann, L.A. et al.; Generalized Image Combinations in Dual KVP Digital Radiography; Med. Phys.; 8:659-667 (1981).

Chuang, K. et al.; A Fast Dual-Energy Computational Method Using Isotransmission Lines and Tables; Med. Phy.; 14:186-192 (1987).

* cited by examiner

METHOD OF AND SYSTEM FOR AUTOMATIC OBJECT DISPLAY OF VOLUMETRIC COMPUTED TOMOGRAPHY IMAGES FOR FAST ON-SCREEN THREAT RESOLUTION

RELATED APPLICATIONS

This patent application and/or patents are related to the following co-pending U.S. applications and/or issued U.S. patents, of the assignee as the present application, the contents of which are incorporated herein in their entirety by reference:

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Detecting Concealed Objects in Computed Tomography Data," invented by Sergey Simanovsky, et al., U.S. application Ser. No. 09/228,380, filed on Jan. 12, 1999, now U.S. Pat. No. 6,195,444, issued on Feb. 27, 2001;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Computed Tomography Apparatus and Method for Classifying Objects," invented by Sergey Simanovsky, et al., U.S. application Ser. No. 09/022,059, filed on Feb. 11, 1998, now U.S. Pat. No. 6,317,509, issued on Nov. 23, 2001;

"Apparatus and method for processing object data in computed tomography data using object projections," invented by Carl R. Crawford, et al., U.S. application Ser. No. 09/228,379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al., U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al., U.S. application Ser. No. 10/171,116, filed on Jun. 13, 2002, now U.S. Pat. No. 6,721,387, issued on Apr. 13, 2004;

"Method and apparatus for stabilizing the measurement of CT numbers," invented by John M. Dobbs, U.S. application Ser. No. 09/982,192, filed on Oct. 18, 2001, now U.S. Pat. No. 6,748,043, issued on Jun. 8, 2004;

"Method and apparatus for automatic image quality assessment," invented by Seemeen Karimi, et al., U.S. application Ser. No. 09/842,075, filed on Apr. 25, 2001, now U.S. Pat. No. 6,813,374, issued on Nov. 2, 2004;

"Decomposition of multi-energy scan projections using multi-step fitting," invented by Ram Naidu, et al., U.S. application Ser. No. 10/611,572, filed on Jul. 1, 2003;

"Method of and system for detecting threat objects using computed tomography images," invented by Zhengrong Ying, et al., U.S. application Ser. No. 10/831,909, filed on Apr. 26, 2004;

"Method of and system for computing effective atomic number image in multi-energy computed tomography," invented by Zhengrong Ying, et al., U.S. application Ser. No. 10/850,910, filed on May 21, 2004;

"Method of and system for adaptive scatter correction in multi-energy computed tomography," invented by Zhengrong Ying, et al., U.S. application Ser. No. 10/853,942, filed on May 26, 2004, now U.S. Pat. No. 7,136,450, issued on Nov. 14, 2006;

"Method of and system for destreaking the photoelectric image in multi-energy computed tomography," invented by Zhengrong Ying, et al., U.S. application Ser. No. 10/860,984, filed on Jun. 4, 2004;

"Method of and system for extracting 3D bag images from continuously reconstructed 2D image slices in computed tomography," invented by Zhengrong Ying, et al., U.S. application Ser. No. 10/864,619, filed on Jun. 9, 2004;

"Method of and system for sharp object detection using computed tomography images," invented by Gregory L. Larson, et al., U.S. application Ser. No. 10/883,199, filed on Jul. 1, 2004;

"Method of and system for X-ray spectral correction in multi-energy computed tomography," invented by Ram Naidu, et al., U.S. application Ser. No. 10/899,775, filed on Jul. 17, 2004;

"Method of and system for detecting anomalies in projection images generated by computed tomography scanners," invented by Anton Deykoon, et al., U.S. application Ser. No. 10/920,635, filed on Aug. 18, 2004;

"Method of and system for stabilizing high voltage power supply voltages in multi-energy computed tomography," invented by Ram Naidu, et al., U.S. application Ser. No. 10/958,713, filed on Oct. 5, 2004, now U.S. Pat. No. 7,136, 451, issued on Nov. 14, 2006;

"Method of and system for 3D display of multi-energy computed tomography images," invented by Zhengrong Ying, et al., U.S. application Ser. No. 11/142,216, filed on Jun. 1, 2005;

"Method of and system for classifying objects using local distributions of multi-energy computed tomography images," invented by Zhengrong Ying, et al., U.S. application Ser. No. 11/183,471, filed on Jul. 18, 2005;

"Method of and system for splitting compound objects in multi-energy computed tomography images," invented by Sergey Simanovsky, et al., U.S. application Ser. No. 11/183, 378, filed on Jul. 18, 2005; and "Method of and system for classifying objects using histogram segment features in multi-energy computed tomography images," invented by Ram Naidu, et al., U.S. application Ser. No. 11/198,360, filed on Aug. 4, 2005.

FIELD OF THE DISCLOSURE

The present disclosure relates to methods of and systems for processing images generated by computed tomography scanners, and more particularly to a method of and a system for automatically displaying objects of volumetric images generated by threat detection systems using computed tomography scanners for fast on-screen threat resolution.

BACKGROUND OF THE DISCLOSURE

Various X-ray baggage scanning systems are known for detecting the presence of explosives and other prohibited items in baggage, or luggage, prior to loading the baggage onto a commercial aircraft. A common technique of measuring a material's density is to expose the material to X-rays and to measure the amount of radiation absorbed by the material, the absorption being indicative of the density. Since many explosive materials may be characterized by a range of densities differentiable from that of other items typically found in baggage, explosives are generally amenable to detection by X-ray equipment.

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Techniques using dual energy X-ray sources are known for providing additional information about a material's characteristics, beyond solely a density measurement. Techniques using dual energy X-ray sources involve measuring the X-ray absorption characteristics of a material for two different energy levels of X-rays. Depending upon the calibration of the scanner, dual energy measurements provide an indication of dual parameters of the material being scanned. For example, at one calibration setting, the dual parameters can be chosen to be the material's effective atomic number (Z is denoted as "effective atomic number") and the material's density. At another calibration setting, the dual parameters can be chosen to be the material's photoelectric coefficients and the material's Compton coefficients. At yet another calibration setting, the dual parameters can be chosen to be an amount of a first material present (e.g., plastic) and an amount of a second material present (e.g., aluminum). Dual energy X-ray techniques for energy-selective reconstruction of X-ray Computer Tomography (hereinafter referred to as CT) images are described, for example, in Robert E. Alvarez and Albert Macovski, "Energy-selective Reconstructions in X-ray Computerized Tomography," Phys. Med. Biol. 1976, Vol. 21, No. 5, 733-744; and U.S. Pat. Nos. 4,029,963 and 5,132,998. One algorithm used to generate such dual parameters from dual energy X-ray projection data is known as the Alvarez/Macovski Algorithm (hereinafter referred to as AMA). Others are known in the art.

One proposed use for such dual energy techniques has been in connection with a baggage scanner for detecting the presence of explosives in baggage. Explosive materials are generally characterized by a known range of atomic numbers and are therefore amenable to detection by such dual energy X-ray sources. One such dual energy source is described in U.S. Pat. No. 5,661,774, entitled "Improved Dual Energy Power Supply," assigned to the present assignee and incorporated herein by reference. Other dual energy sources are known in the art.

Most explosives capable of significantly damaging an aircraft are sufficiently large in length, width, and height so as to be readily detectable by an X-ray scanner system regardless of the explosive's orientation within the baggage. Plastic explosives, however, present a particular challenge to baggage scanning systems. Due to their moldable nature, plastic explosives may be formed into geometric shapes that are difficult to detect. A plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Accordingly, a great deal of effort has been made to design a better baggage scanner. Such designs, for example, have been described in U.S. Pat. No. 4,759,047 (Donges et al.); U.S. Pat. No. 4,884,289 (Glockmann et al.); U.S. Pat. No. 5,132,988 (Tsutsui et al.); U.S. Pat. No. 5,182,764 (Peschmann et al.); U.S. Pat. No. 5,247,561 (Kotowski); U.S. Pat. No. 5,319,547 (Krug et al.); U.S. Pat. No. 5,367,552 (Peschmann et al.); U.S. Pat. No. 5,490,218 (Krug et al.) and German Offenlegungsschrift DE 31 503 06 A1 (Heimann GmbH).

At least one of these designs, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear array of detectors disposed as a single row in the shape of a circular arc having a center of curvature at the focal spot of the X-ray source, i.e., the point within the X-ray source from which the X-rays emanate. The X-ray source generates a fan shaped beam, or fan beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from an appropriate point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well-known algorithms, a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner. In general, the resolution of the CT image is inversely proportional to the width of the receiving surface of each detector in the plane of the fan beam.

Referring to the drawings, FIGS. 1, 2 and 3 show perspective, end cross-sectional and radial cross-sectional views, respectively, of a typical baggage scanning system 100, which includes a conveyor system 110 for continuously conveying baggage or luggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and, which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 is preferably a two-dimensional array, such as the array described in U.S. Pat. No. 6,091,795 entitled, "Area Detector Array for Computed Tomography Scanning System." Other suitable arrays are known in the art. The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles. When dual energy scanning mode is configured, the control system 136 supplies modulated high voltages with respect to alternating projection angles to the X-ray tube 128. The detector array 130 then receives data corresponding to high-energy and low-energy X-ray spectra in alternating projection angles.

Post-reconstruction analysis and pre-reconstruction analysis are the two prior art techniques generally recognized for using dual energy X-ray sources in materials analysis (e.g., in a baggage scanner for detecting the presence of explosives in baggage). In post-reconstruction analysis, the signal flow is as shown in FIG. 4. The scanner 120 is typically similar to the one shown in FIGS. 1-3 and has an X-ray source capable of producing a fan or cone beam at two distinct energy levels (i.e., dual energy). The DAS 134 gathers signals generated by detector array 130 at discrete angular positions of the rotating platform 124, and passes the signals to the pre-processing unit 206. The pre-processing unit 206 re-sorts the data it receives from the DAS 134 in order to optimize the sequence for the subsequent mathematical processing. The pre-processing unit 206 also corrects the data from the DAS 134 for detector temperature, intensity of the primary beam, gain and offset, and other deterministic errors. Finally, the pre-processing unit 206 extracts data corresponding to high-energy views and routes it to a high-energy path 208, and routes the data corresponding to low-energy views to a low-energy path 210. A first reconstruction computer 218 receives the projection data from the high-energy path 208 and generates a CT image $I_H$ 226 corresponding to the high-energy series of projections. A second reconstruction computer 220 receives the projection data from the low-energy path 210 and generates a CT image $I_L$ 224 corresponding to the low-energy series of projections. A post-processing unit 230 receives the high-energy CT image 226 and the low-energy CT image 224 and performs voxel-by-voxel processing to yield the effective atomic number (Z is denoted as effective atomic number) image $I_z$ 232. The Z image 232 and the high-energy CT image 226 can be provided to operators on a display 240, and both images can be used for automatic threat detection in 238 as well. The images from the post-reconstruction analysis usually do not yield accurate estimates of the material's effective atomic number, and suffer low SNR (Signal to Noise Ratio) and many artifacts as well.

In pre-reconstruction analysis, the signal flow is as shown in FIG. 5. As is described herein for pre-reconstruction analysis, the dual energy decomposition computer 212 receives the projection data on the high-energy path 208 and the low-energy path 210 and performs the Alvarez/Macovski Algorithm to produce a first stream of projection data $A_c$ 214, which is dependent on a first parameter of the material being scanned, and a second stream of projection data $A_p$ 216, which is dependent on a second parameter of the material scanned. The first material parameter is often the Compton coefficient $a_c$, and the second material parameter is often the photoelectric coefficient $a_p$. A first reconstruction computer 219 receives the first stream of projection data 214 and generates a Compton image $I_c$ 227 from the series of projections corresponding to the first material parameter. A second reconstruction computer 221 receives the second stream of projection data 216 and generates a photoelectric image $I_p$ 225 from the series projections corresponding to the second material parameter. The third reconstruction computer 218 receives the stream of projection data 208 and generates a high-energy CT image $I_H$ 226. The two images 225 and 227 are processed in the post-processing unit 230 to yield a Z image $I_z$ 232. The High-energy CT image 226 and the Z image 232 can be provided to operators on a display 240, and both images can be used for automatic threat detection in detection unit 238 as well. The pre-reconstruction analysis yields better estimates of material's effective atomic number than the post-reconstruction analysis. However the pre-reconstruction analysis requires one more reconstruction computer than the post-reconstruction analysis.

Various approaches have been used for decomposition of the input projection data $P_L$ and $P_H$ into Compton projections $A_c$ and photoelectric projections $A_p$. For example, the AMA method approximates $P_L$ and $P_H$ using polynomial functions in terms of $A_c$ and $A_p$. The coefficients of the polynomial functions are determined through a calibration procedure as follows. By measuring the projection values of the combination of various thicknesses of two known materials, the coefficients can be calculated through a polynomial least squares fitting between the measured and modeled $P_L$ and $P_H$. Once the coefficients of the polynomial functions are determined, the decomposition of the Compton and Photoelectric projections $A_c$ and $A_p$ from projections $P_L$ and $P_H$ is usually solved using the Newton-Raphson method.

Another prior art method of performing decomposition is the direct approximation method, discussed in L. A. Lehmann, R. E. Alvarez, A. Macovski, W. R. Brody, N. J. Pelc, S. J. Riederer, and A. L. Hall, *Generalized Image Combinations In Dual KVP Digital Radiography*, Med. Phys. 8, 659-667 (1981). In the direct approximation method, $A_c$ and $A_p$ are approximated as polynomial functions in terms of $P_L$ and $P_H$. The coefficients of the polynomial functions in the direct approximation method are determined through a calibration procedure by measuring the projection values of the combination of various thicknesses of two known materials.

In yet another prior art method, decomposition is accomplished using iso-transmission lines, described K. Chuang and H. K. Huang, *A Fast Dual-Energy Computational Method Using Isotransmission Lines and Tables*, Med. Phys. 14, 186-192 (1987). According to this method, for a given projection value, an isotransmission line is represented by a linear equation in two basis functions. The isotransmission line method requires a large amount of calibration data. Further, the isotransmission line becomes increasingly non-linear as the projection value increases. In such a situation, the linear equations are not valid and the method causes large approximation errors.

CT images and Z (effective atomic number) images can be generated from either the pre-reconstruction or the post-reconstruction analysis. The CT number at each pixel of the CT image represents density measurements of scanned materials; and the Z number at each pixel of the Z image represents effective atomic number measurements of scanned materials. An automatic threat detection algorithm can use both the CT images and the Z images to detect prohibited items, such as explosives, as described in "Computed tomography apparatus and method for classifying objects" invented by Simanovsky, et al. (U.S. Pat. No. 6,317,509).

Since the referenced automatic threat detection approach yields a certain percentage of false alarms, operators are required to intervene to resolve any falsely detected bags. It is very labor intensive to open a bag and perform a hand-search each time. Therefore, it is desirable to display the CT images and the Z images in combination with the automatic threat detection results on a 3D display device, such as the "Volumetric three-dimensional display system" invented by Dorval, et al. (U.S. Pat. No. 6,554,430), or on a 2D LCD/CRT display with 3D volume rendering using techniques such as the "Volume rendering techniques for general purpose graphics hardware" by Christof Rezk-Salama in his Ph. D. dissertation at University of Erlangen in December 2001.

FIG. 6 shows a prior art display system for on-screen threat resolution. CT images, Z images, and automatic threat detection results are generated in unit 700, and are fed into the display system 820. The display data processing unit 840 processes the CT images, Z images, and the automatic threat detection results to generate display images for the display device 844. An operator 860 looks at the display device 844 and uses the input device 850 to interact with the display system. The input device can be divided into two groups of functions: bag resolution functions 852 and bag manipulation functions 854. The bag resolution functions 852 include one or more recommended actions for each detected threat object in the bag as well as one or more recommended actions for the bag. The actions for threat objects can include clearing an object, suspecting an object for further investigation, or alarming an object. The action for the bag can also include clearing the bag, suspecting the bag, or alarming the bag based on the aggregate actions for all the threat objects. The bag manipulation functions 854 may include different functions for manipulating the bag, such as rotating the bag.

On-screen threat resolution requires operators to understand the contents of a scanned bag, and in particular, to understand the nature of the detected threat objects using the automatic threat detection algorithm; and to make a decision with regard to each of detected threat objects as to whether it is a real threat or a false alarm. Accuracy and time are the two most important factors in on-screen threat resolution. The display systems in the prior art, such as "Operator console for article inspection systems" filed on behalf of Bruce S. Lee et al. (U.S. Pat. No. 5,870,449), bring the information of a scanned bag onto a display device. Since detected objects may be hidden inside some items or may be blocked by other objects, manipulation of the display images is required for operators to understand and identify the detected objects. Manipulation of the display images is time consuming and causes fatigue of operators, thus degrading the accuracy of on-screen threat resolution.

SUMMARY OF THE DISCLOSURE

The present disclosure provides a method of and a system for automatic object display of volumetric CT data for fast on-screen threat resolution. The volumetric CT data includes a CT image when using a single energy CT scanner; and the volumetric CT data includes a CT image and a Z image when using a dual energy CT scanner. In one embodiment of the present disclosure, a label image is generated from an automatic threat detection algorithm by using the volumetric CT data. The volumetric CT data and the label image are used to generate visualization parameters for each threat object. The visualization parameters are used to automatically display a threat object in a way so that operators understand and resolve the detected threat object without any manipulation of the display images.

Detected threat objects may be hidden inside some items or may be blocked by other objects. In one embodiment of the present disclosure, the automatic object display removes a portion of image of a scanned bag that blocks the image of the detected threat object under examination. The removal of a portion of the image of the bag automatically reveals the image of the detected threat object to operators for examination. This function is called herein as "virtual bag opening".

A human usually interprets a detected threat object with a different response time at a different orientation of the detected threat object. In one embodiment of the present disclosure, the automatic object display optimally aligns a detected threat object with the display screen so that an operator can understand and identify the detected threat object in the shortest time. This function is called herein as "optimal object alignment".

In one embodiment of the present disclosure, at least one of the visualization parameters includes an opening plane in the bag, at which the bag is virtually opened, and an orientation vector, along which the object is optimally aligned. The orientation vector is used to rotate the image of the bag so that the object under examination is aligned with the display screen. The opening plane, whose normal vector is the orientation vector, determines which portion of the bag is removed from image rendering.

In one embodiment of the present disclosure, a whole threat object is desired to be rendered and displayed, and an opening plane can be a plane that intersects the threat object and partitions the bag into two halves so that the threat object is completely in one of the two halves. In an alternative embodiment of the present disclosure, only a portion of the object is desired to be rendered and displayed, and a plane passing through the mass center or geometric center of the selected threat object can be an opening plane.

In one embodiment of the present disclosure, the orientation vector is obtained by applying an eigen-analysis on a threat object. The eigen-analysis generates three vectors corresponding to the ascending order of the eigen-values. Any of these three vectors can be used as the orientation vector depending on the shape of an object. In an alternative embodiment of the present disclosure, the vector along which the object has the maximal or minimal projection area can also be used as an orientation vector.

In one embodiment of the present disclosure, given the visualization parameters, an optimally aligned and virtually opened bag image can be obtained by A) rotating the image of the bag according to the orientation vector to optimally align the selected threat object; B) removing the front portion of the bag image according to the opening plane; C) rendering the optimally-aligned virtually-opened 3D bag into a display image.

In one embodiment of the present disclosure, multiple display images for a single threat object generated from different visualization parameters are displayed to operators so that the maximal information of the threat object is presented to operators at one time or in a sequence with a predetermined time interval.

In an alternative embodiment of the present disclosure, bag manipulation functions as described in the prior art can still be provided to operators after displaying the optimal display images for a single threat object automatically generated by different visualization parameters.

In an alternative embodiment of the present disclosure, the visualization parameters can also be generated without using a Z image. In this case, the CT image is generated from a single energy CT scanner. A label image is generated from an automatic threat detection algorithm, which only takes the CT image without a Z image. The CT image and the label image are used to generate visualization parameters for each threat object. The visualization parameters are used for automatically displaying each detected threat object without any manipulation of the display images.

In an alternative embodiment of the present disclosure, a label image containing a plurality of objects can be generated from a segmentation algorithm without discrimination steps. Image processing steps involved in segmenting a 3D CT image into a plurality of objects are known to those skilled in the art of image processing.

In an alternative embodiment of the present disclosure, a stereoscopic display device can be used to generate a true 3D image of a bag for operators to examine. A virtually opened and optimally aligned bag can be rendered twice at two different viewing locations with a viewing angle being a normal viewing angle, which is between 1.5 degrees and 6 degrees for an average person.

Yet in another alternative embodiment of the present disclosure, automatic threat detection algorithms for explosive detection or weapon detection can be modified to detect objects which are not explosives or weapons, but helpful in identifying the presence of threat objects, such as bullets, and components of improvised explosive devices including detonators, wires, and timing devices.

A system for automatic object display is also disclosed. The system includes modules configured to implement the above functionality. The system may include a display data processing unit, a display device, an input device, a module for generating visualization parameters for each threat object.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

In accordance with at least one aspect of the present disclosure, a method and a system are provided for automatic object display of volumetric multi-energy CT images reconstructed from the CT projection data acquired by scanning a set of objects using at least two x-ray spectra, wherein the projection data includes a set of low energy projections and a set of high energy projections. In one preferred embodiment, the method first generates a CT image and a Z (effective atomic number) image. An automatic threat detection system generates a label image from the CT image and the Z image. Visualization parameters for each threat object are generated by processing the CT image, the Z image, and the label image.

Using the visualization parameters associated with each threat object, optimal display images are automatically generated to present images of each threat object and its surrounding objects to operators for examination. Since optimal display images with respect to each threat object are automatically generated and displayed, operators do not require manipulation of display images to interpret and understand threat objects for resolution, thus reducing time for on-screen threat resolution.

Figure 7A:
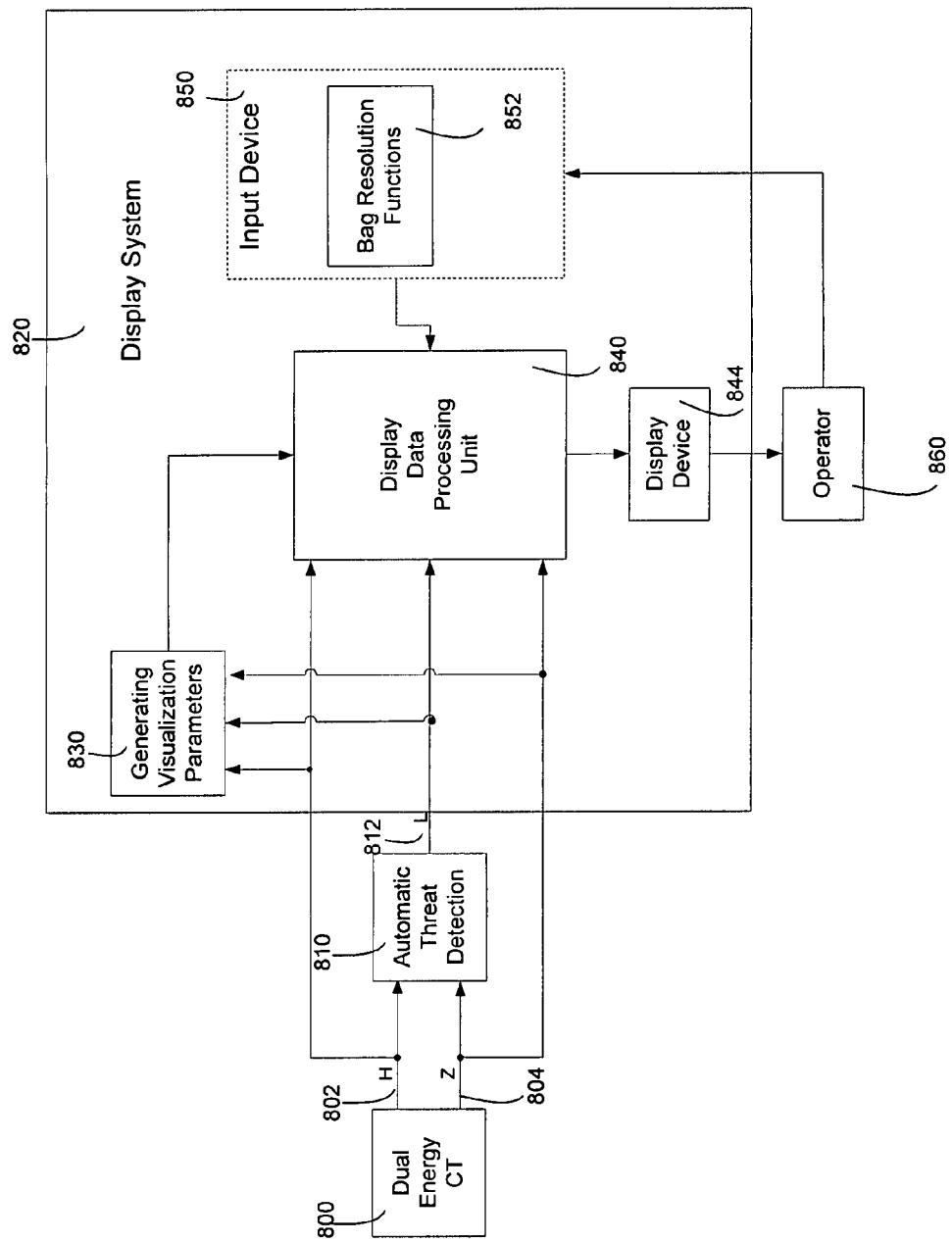
FIG. 7A contains a flow block diagram which illustrates the logical flow of one embodiment of a system for automatic object display of volumetric multi-energy CT images for on-screen threat resolution in accordance with one aspect of the present disclosure.

FIG. 7A shows a flow diagram which illustrates the logical flow of one embodiment of an automatic object display of volumetric multi-energy CT images with automatic threat detection results for fast on-screen threat resolution of the present disclosure. The dual energy CT scanner 800 generates 3D volumetric CT image data H 802 and 3D volumetric Z (effective atomic number) image data Z 804. The generation of the CT image data and Z image data from a dual energy CT scanner uses methods described in the assignee's "Method of and system for adaptive scatter correction in multi-energy computed tomography" by Zhengrong Ying, et al. U.S. Pat. No. 7,136,450, issued on Nov. 14, 2006; incorporated herein by reference; "Method of and system for destreaking the photoelectric image in multi-energy computed tomography" by Zhengrong Ying, et al. U.S. application Ser. No. 10/860,984, filed on Jun. 4, 2004; incorporated herein by reference; "Decomposition of multi-energy scan projections using multi-step fitting" by Ram Naidu, et al. U.S. application Ser. No. 10/611,572, filed on Jul. 1, 2003, incorporated herein by reference; "Method of and system for computing effective atomic number image in multi-energy computed tomography" by Zhengrong Ying, et al. U.S. application Ser. No. 10/850,910, filed on May 21, 2004, incorporated herein by reference; and "Method of and system for x-ray spectral correction in multi-energy computed tomography," invented by Ram Naidu, et al. U.S. Pat. No. 7,136,451, issued on Nov. 14, 2006; incorporated herein by reference.

The CT image data H comprise data representing a plurality of voxels, each of which represents a density measurement of scanned objects; for example, water has a physical density of 1 g/cc, and the CT image of water has value of 1000 Hounsfield Units (HU). The effective atomic number image Z also comprises a plurality of voxels, each of which represents an effective atomic number measurement of scanned objects; for example, Aluminum has an atomic number of 13, and the Z image of Aluminum has value of 1300 Z Units (ZU).

Referring to FIG. 7A, the CT image data H 802 and the Z image data Z 804 are fed into an automatic threat detection unit 810. The automatic threat detection unit uses methods described in the assignee's "Apparatus and method for eroding objects in computed tomography data," invented by Sergey Simanovsky, et al., U.S. Pat. No. 6,075,871, issued on Jun. 13, 2000, incorporated herein by reference; "Apparatus and method for combining related objects in computed tomography data," invented by Ibrahim M. Bechwati, et al., U.S. Pat. No. 6,128,365, issued on Oct. 3, 2000, incorporated herein by reference; "Apparatus and method for detecting sheet objects in computed tomography data," invented by Sergey Simanovsky, et al., U.S. Pat. No. 6,025,143, issued on Feb. 15, 2000, incorporated herein by reference; "Apparatus and method for classifying objects in computed tomography data using density dependent mass thresholds," invented by Ibrahim M. Bechwati, et al., U.S. Pat. No. 6,076,400, issued on Jun. 20, 2000, incorporated herein by reference. The automatic threat detection unit 810 generates data representing a label image L 812, in which all the voxels of a detected threat are assigned a same unique positive integer number. For example, if there are three detected threats in a bag, the corresponding label image will have labels from one to three indicating the first, second, and the third threat object; the voxels of the first object are all assigned with a label value of one in the label image, and so on; the voxels that do not belong to any threat object are assigned a label value of zero.

Referring to FIG. 7A, the unit 830 takes the CT image data H, the atomic number image data Z, and the label image data L, and generates visualization parameters for each threat object. The details of generating visualization parameters from the CT image, the Z image, and the label image are described below.

Let $H(x,y,z)$ be the CT image, $Z(x,y,z)$ be the Z image, and $L(x,y,z)$ be the label image, where $x=0,\ldots,I-1$, $y=0,\ldots,J-1$, $z=0,\ldots,K-1$. Let $V_l$ be the visualization parameter set of $l^{th}$ ($l=1,\ldots,M$) threat object. In accordance with respect to one aspect of the present disclosure, the visualization parameters contain at least an orientation vector and an opening plane with its normal vector being the orientation vector for automatic object display. The details of generating orientation vectors and opening planes are described below.

In accordance with one aspect of the present disclosure, orientation vectors can be obtained by performing an eigen-analysis on a threat object using the method described in "Apparatus and method for processing object data in computed tomography data using object projections" invented by Carl R. Crawford et al., U.S. Pat. No. 6,345,113, issued on Feb. 5, 2002; incorporated herein by reference. The eigen analysis on a threat object generates three eigen-vectors, denoted as $\vec{v}_e^m$, $m=0, 1, 2$. The eigen-vector $\vec{v}_e^0$ corresponds to the minimal eigen-value, the eigen-vector $\vec{v}_e^1$ corresponds to the medium eigen-value, and the eigen-vector $\vec{v}_e^2$ corresponds to the maximal eigen-value. Therefore, the eigen-vector $\vec{v}_e^0$ indicates the shortest dimension (and spatial orientation of that dimension) of the threat object, the eigen-vector $\vec{v}_e^1$ indicates the medium dimension (and spatial orientation of that dimension) of the threat object, and the eigen-vector $\vec{v}_e^2$ indicates the longest dimension (and spatial orientation of that dimension) of the threat object.

In accordance with one aspect of the present disclosure, orientation vectors can also be obtained by using maximal and minimal projection area criteria. Given the $l^{th}$ threat object $\{(x',y',z') \in (L(x',y',z')=l)\}$, the maximal projection area vector, denoted as $\vec{v}_p^{max}$, and the minimal projection area vector, denoted as $\vec{v}_p^{min}$ are computed as follows, $$\vec{v}_p^{max} = \underset{\vec{v}}{\mathrm{argmax}} \left( \iint_{R_p(\vec{v})} f_z(x,y) dx dy + \iint_{R_p(\vec{v})} f_x(y,z) dy dz + \iint_{R_p(\vec{v})} f_y(x,z) dx dz \right)$$

$$\vec{v}_p^{max} = \underset{\vec{v}}{\mathrm{argmin}} \left( \iint_{R_p(\vec{v})} f_z(x,y) dx dy + \iint_{R_p(\vec{v})} f_x(y,z) dy dz + \iint_{R_p(\vec{v})} f_y(x,z) dx dz \right)$$

where $R_p(\vec{v})$ is a 2D projection region of the threat object along the direction $\vec{v}$, $$R_p(\vec{v}) = \{(x,y,z) | [x,y,z]^t = (I - \vec{v}\vec{v}^t)[x',y',z']^t, (x',y',z') \in (L(x',y',z') = l)\}$$

$f_z(x,y)$, $f_x(y,z)$, and $f_y(x,z)$ are the explicit functions representing the $l^{th}$ threat object. In other words, the following functions are the same function describing the voxels occupied by the $l^{th}$ threat object:

$$z = f_z(x,y), x = f_x(y,z), y = f_y(x,z), \text{ and } L(x',y',z') = l.$$

The maximal projection area vector is a normal vector of a plane, on which the selected threat object is projected, yields the maximal projection area; while the minimal projection area vector is a normal vector of a plane, on which the selected threat object is projected, yields the minimal projection area.

By aligning a threat object to operators with respect to the eigen-vectors, the maximal projection area vector, or the minimal projection area vector, the information of the threat object, particularly the shape information, is maximally presented to operators, allowing operators to interpret, understand and identify the threat object in a faster way than using manual manipulations.

After obtaining an orientation vector for the $l^{th}$ threat object as described above, opening planes can be obtained as follows.

In accordance with one aspect of the present disclosure, a front opening plane, which virtually opens the bag just in front of the threat object, can be obtained by the following plane equation, $$\vec{v}[x - X_{max}, y - Y_{max}, z - Z_{max}]^t = 0$$

where $\vec{v}$ is the orientation vector, $(X_{max}, Y_{max}, Z_{max})$ is the maximal extending point of the threat object along the orientation vector.

In accordance with one aspect of the present disclosure, a mass center opening plane, which virtually opens the bag passing through the mass center of the threat object, can be obtained by the following plane equation, $$\vec{v}[x - X_{mass}, y - Y_{mass}, z - Z_{mass}]^t = 0$$

where $\vec{v}$ is the orientation vector, $(X_{mass}, Y_{mass}, Z_{mass})$ is the mass center of the selected threat object and is calculated as follows, $$X_{mass} = \sum_{x, L(x,y,z)=l} xH(x, y, z),$$

$$Y_{mass} = \sum_{y, L(x,y,z)=l} yH(x, y, z),$$

$$Z_{mass} = \sum_{z, L(x,y,z)=l} zH(x, y, z)$$

In accordance with one aspect of the present disclosure, a geometric center opening plane, which virtually opens the bag passing through the geometric center of the threat object, can be obtained by the following plane equation, $$\vec{v}[x - X_{geo}, y - Y_{geo}, z - Z_{geo}]^t = 0$$

where $\vec{v}$ is the orientation vector, $(X_{geo}, Y_{geo}, Z_{geo})$ is the geometric center of the selected threat object and is calculated as follows, $$X_{geo} = \sum_{x, L(x,y,z)=l} x,$$

$$Y_{geo} = \sum_{y, L(x,y,z)=l} y,$$

$$Z_{geo} = \sum_{z, L(x,y,z)=l} z$$

Referring to FIG. 7A, the display data processing unit 840 takes the CT image, the Z image, the label image, and the visualization parameters to generate display images, which are displayed on a display device 844 to operators 860. The display device 844 may be a true 3D displaying device, such as "Volumetric three-dimensional display system" by Dorval, et al. (U.S. Pat. No. 6,554,430), or a 2D LCD/CRT display. The display data processing unit 840 uses the method described in "Method of and system for 3D display of multi-energy computed tomography images," invented by Zhengrong Ying, et al., U.S. application Ser. No. 11/142,216, filed on Jun. 1, 2005 (hereinafter referred to as Assignee's 3D DISPLAY); incorporated herein by reference; to generate display images from the CT image, Z image, and the label image of a scanned bag.

Figure 1:
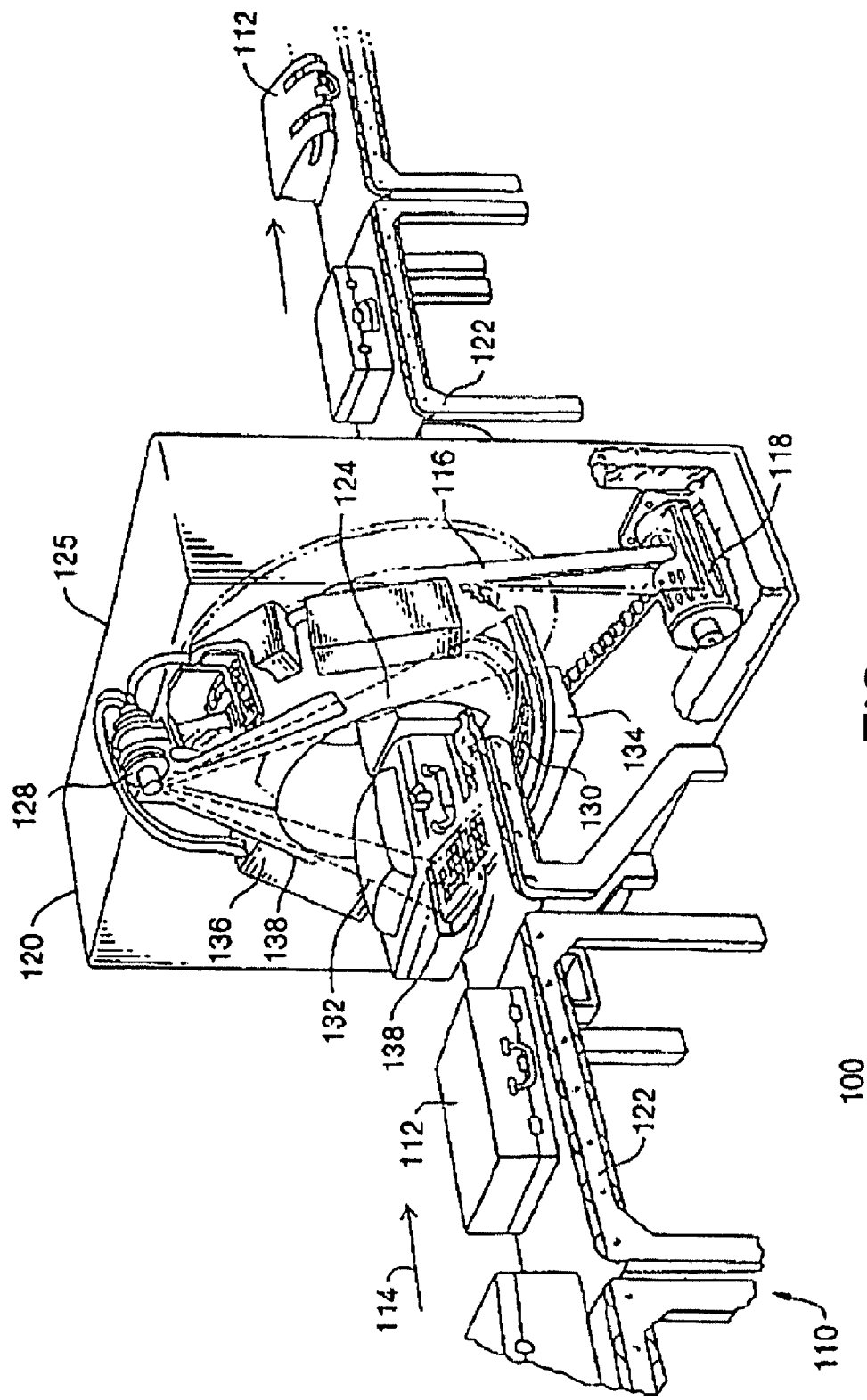
FIG. 1 is a perspective view of a baggage scanning system, known in the prior art, and which can be adapted to incorporate the system and perform method described herein.
Figure 2:
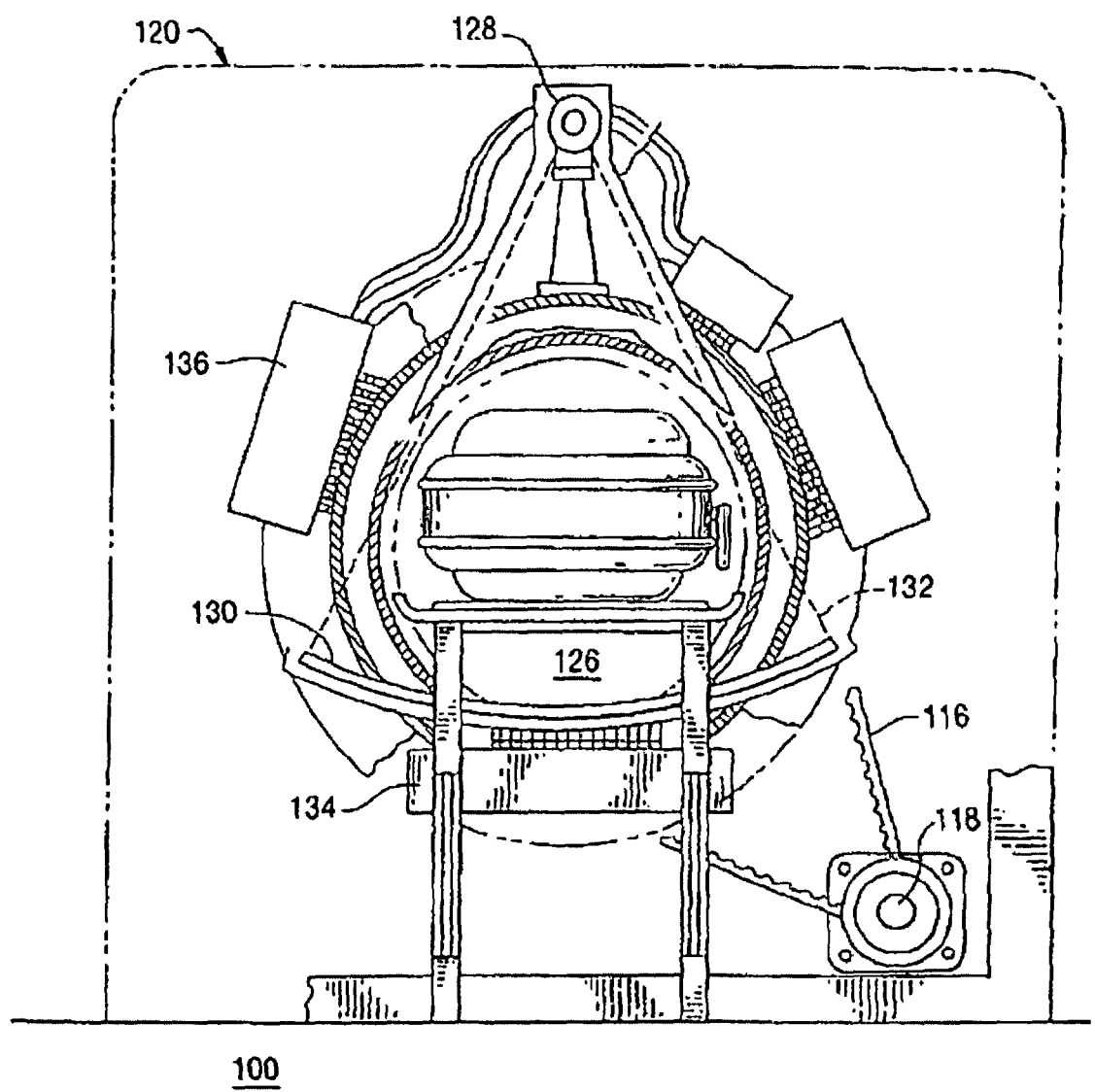
FIG. 2 is a cross-sectional end view of the system of FIG. 1.
Figure 3:
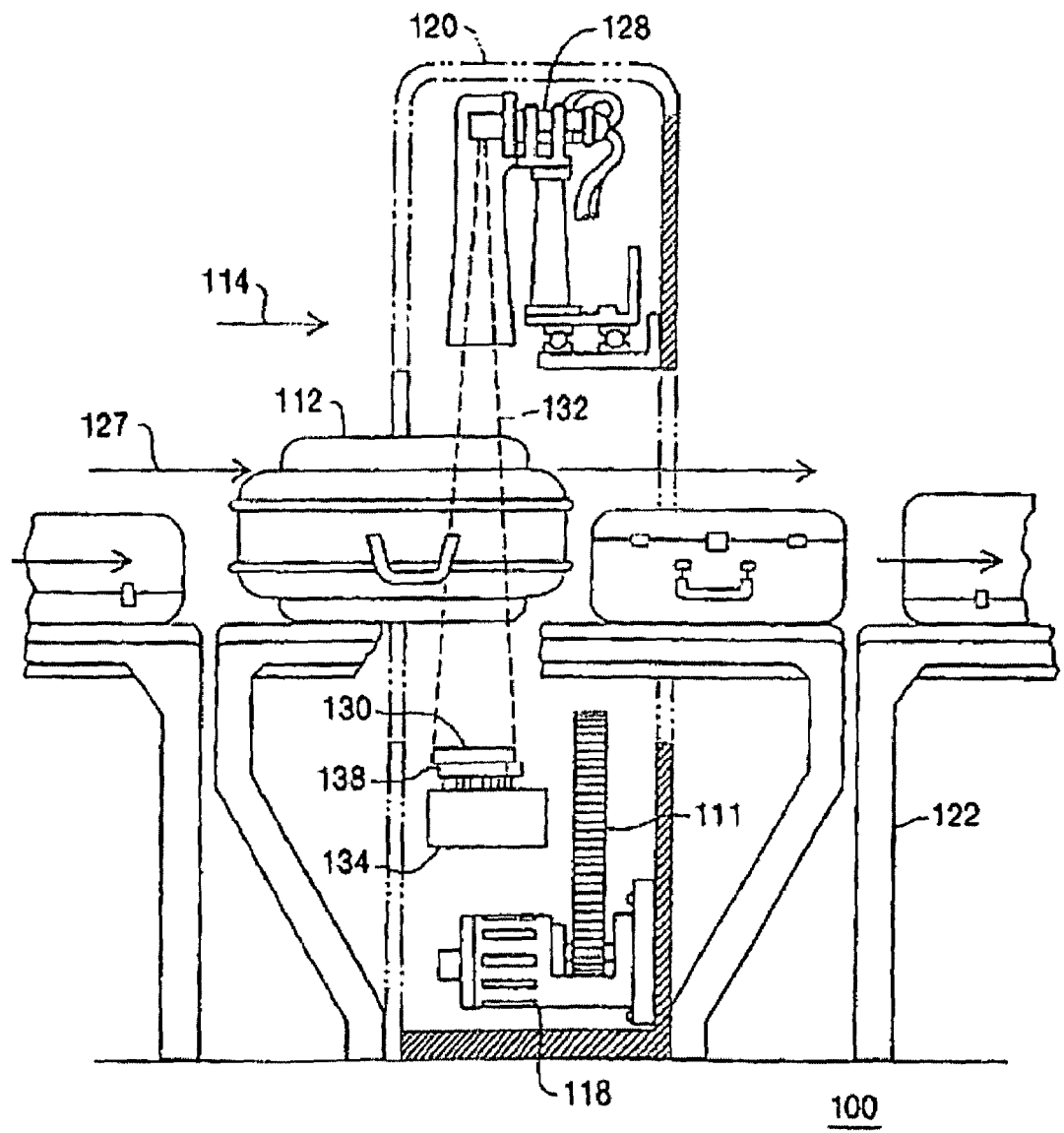
FIG. 3 is a cross-sectional radial view of the system of FIG. 1.
Figure 4:
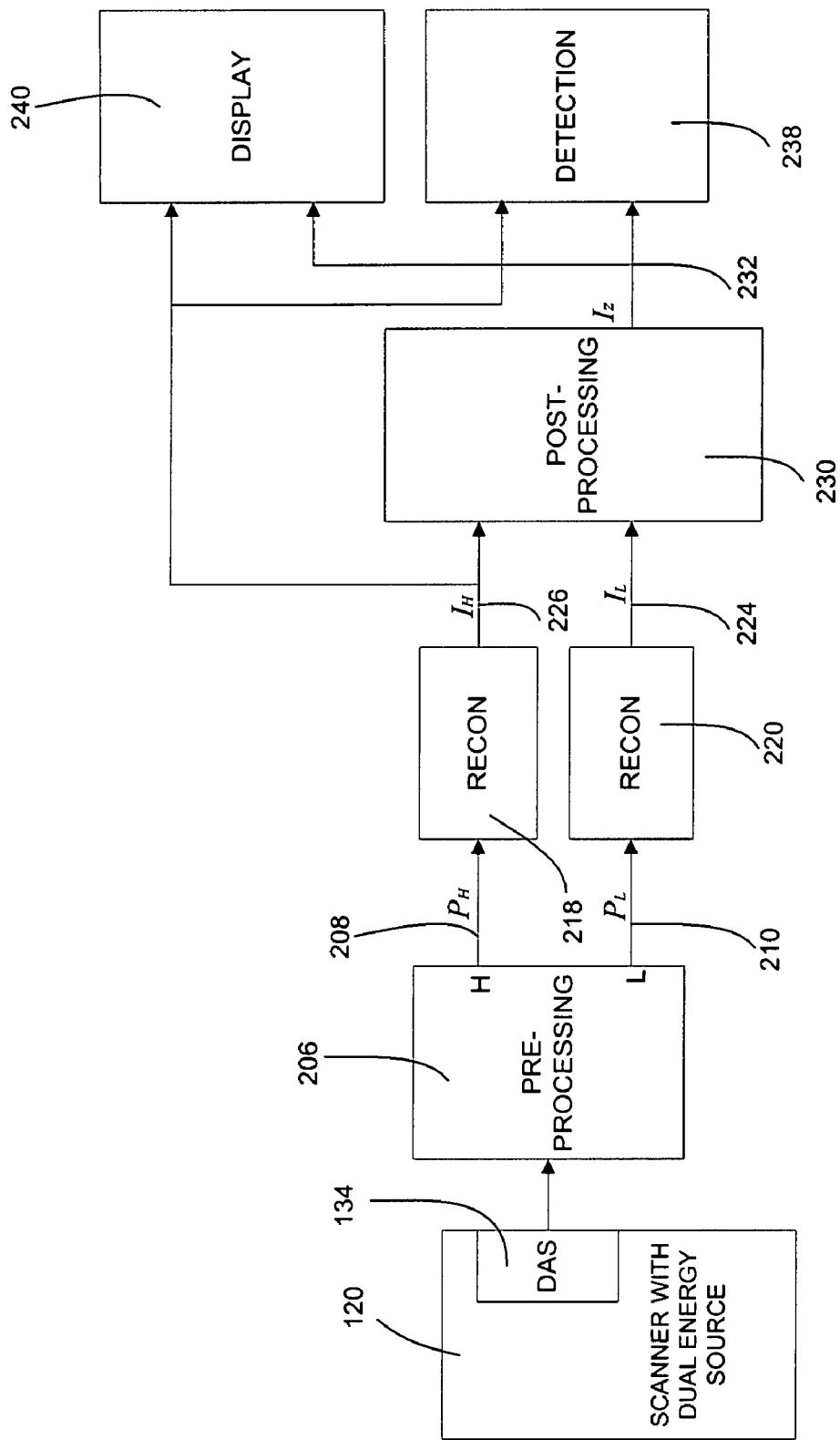
FIG. 4 is a signal flow block diagram of a prior art system capable of performing post-reconstruction analysis, useful in the system of FIG. 1.
Figure 5:
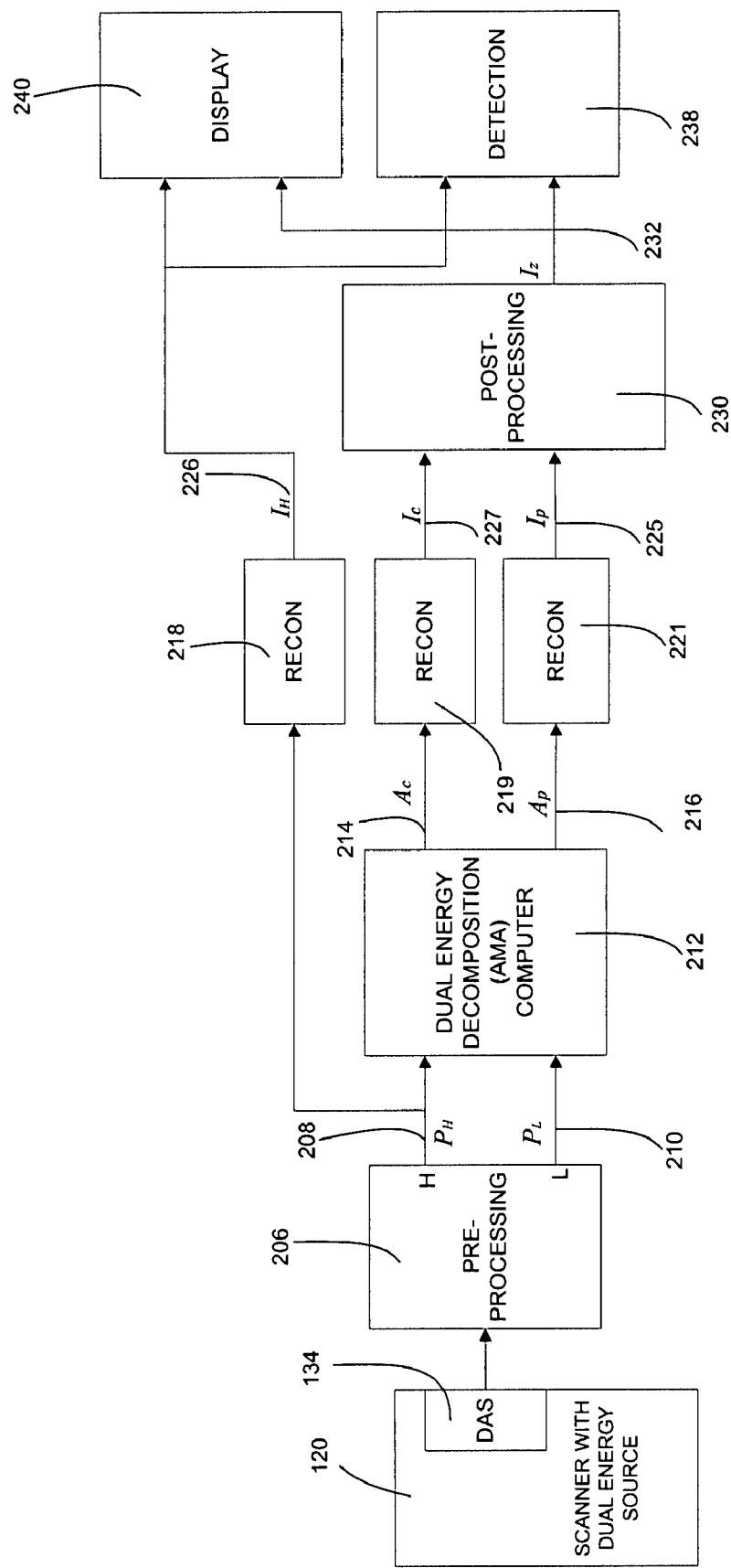
FIG. 5 is a signal flow block diagram of a prior art system capable of performing pre-reconstruction analysis, useful in the system of FIG. 1.
Figure 6:
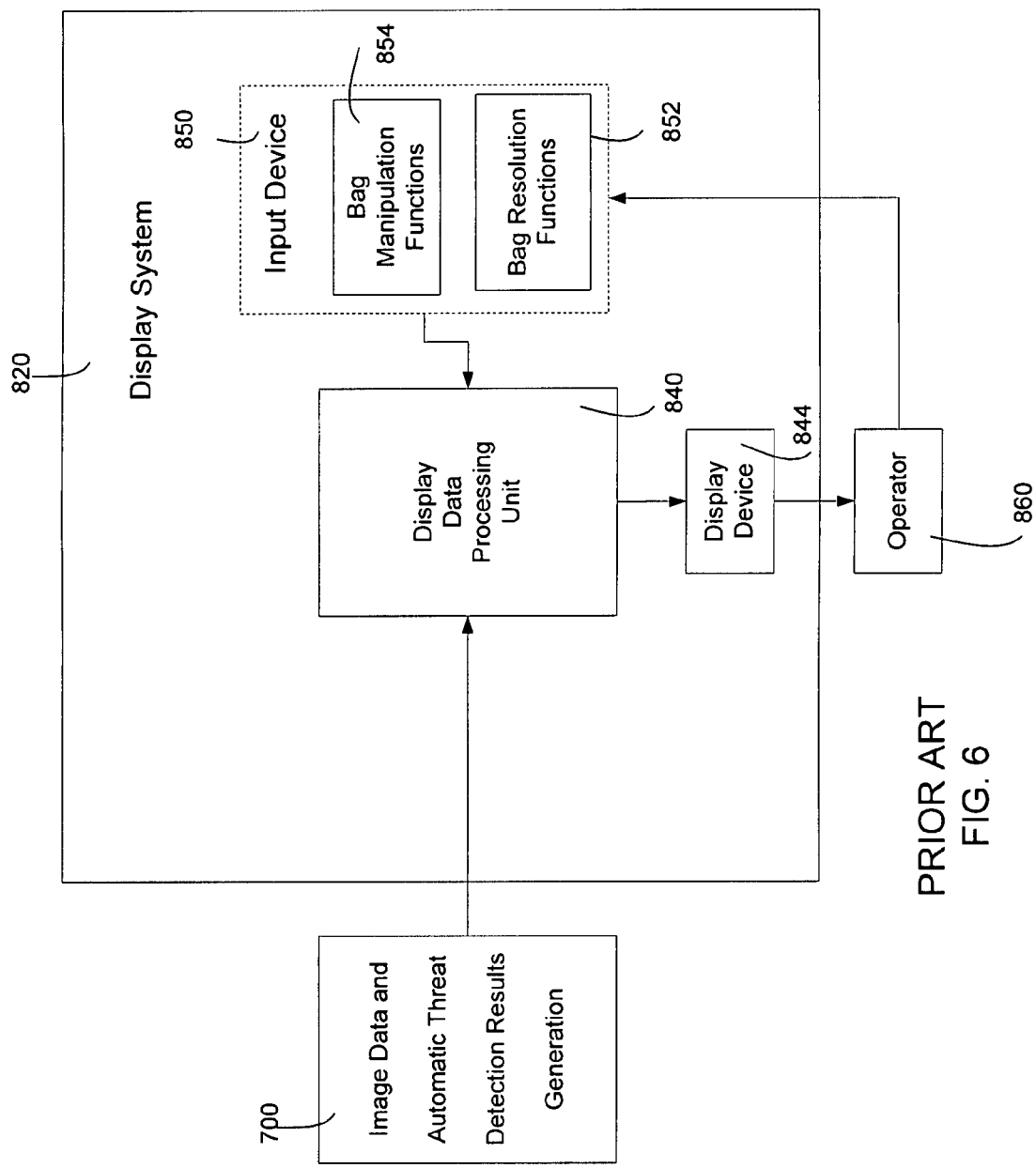
FIG. 6 contains a flow block diagram which illustrates the logical flow of a prior art display system for on-screen threat resolution.

Referring to FIG. 7A, the input device may only include the bag resolution functions 852, since the bag manipulation functions 854 in the prior art display system as depicted in FIG. 6 are replaced by the automatic generation of the visualization parameters based on the property of each detector threat object. Experiments have demonstrated that operators reduce time in on-screen threat resolution while maintaining the same threat detection performance.

In addition to the virtual bag opening and optimal object alignment, the visualization parameters can include colorization information, metal information, and clutter information as described in the Assignee's 3D DISPLAY application. The information is configured in a configuration file, which can be set by each individual operator based on personal preference.

In accordance with one aspect of the present disclosure, the colorization information includes the colorization of threat objects, metal parts, and clutter of the scanned bag. Since timing devices, wires and detonators are mostly made of metal, it is important to highlight metal parts in a scanned bag for on-screen threat resolution. The classification of each voxel V(x,y,z) can be obtained as follows:

$$V(x, y, z) = \begin{cases} 1, & H(x, y, z) \geq T_H || Z(x, y, z) \geq T_Z \\ 0 & H(x, y, z) < T_H \& Z(x, y, z) < T_Z \end{cases}$$

when V(x,y,z) is 1, the voxel is metal, and when V(x,y,z) is 0, the voxel is not metal. An example of $T_H$ is set at 2200, and an example of $T_Z$ is set at 1250.

In accordance with one aspect of the present disclosure, the metal information in the visualization parameter can also invoke a metal removal function, which is implemented by mapping the transparency of metal voxels to be completely transparent. This function is useful in increasing visual attention of the metal objects and the objects nearby.

Clutter includes the voxels or objects that are within a predefined range of CT numbers and Z numbers, which are usually non-threat and non-metal voxels or objects. Clutter color toggling is used to highlight clutter of a scanned bag. Clutter removal is implemented in the same way as the metal removal function, and is useful in revealing hidden threat objects inside or behind clutter.

In accordance with one aspect of the present disclosure, other visualization parameters include the values for window and level and transparency mapping. The details of changing window and level values are described in the Assignee's 3D DISPLAY application, mentioned above. The transparency mapping function allows different ranges of CT numbers and Z numbers to be mapped to different transparency values for different visual effects.

Figure 7B:
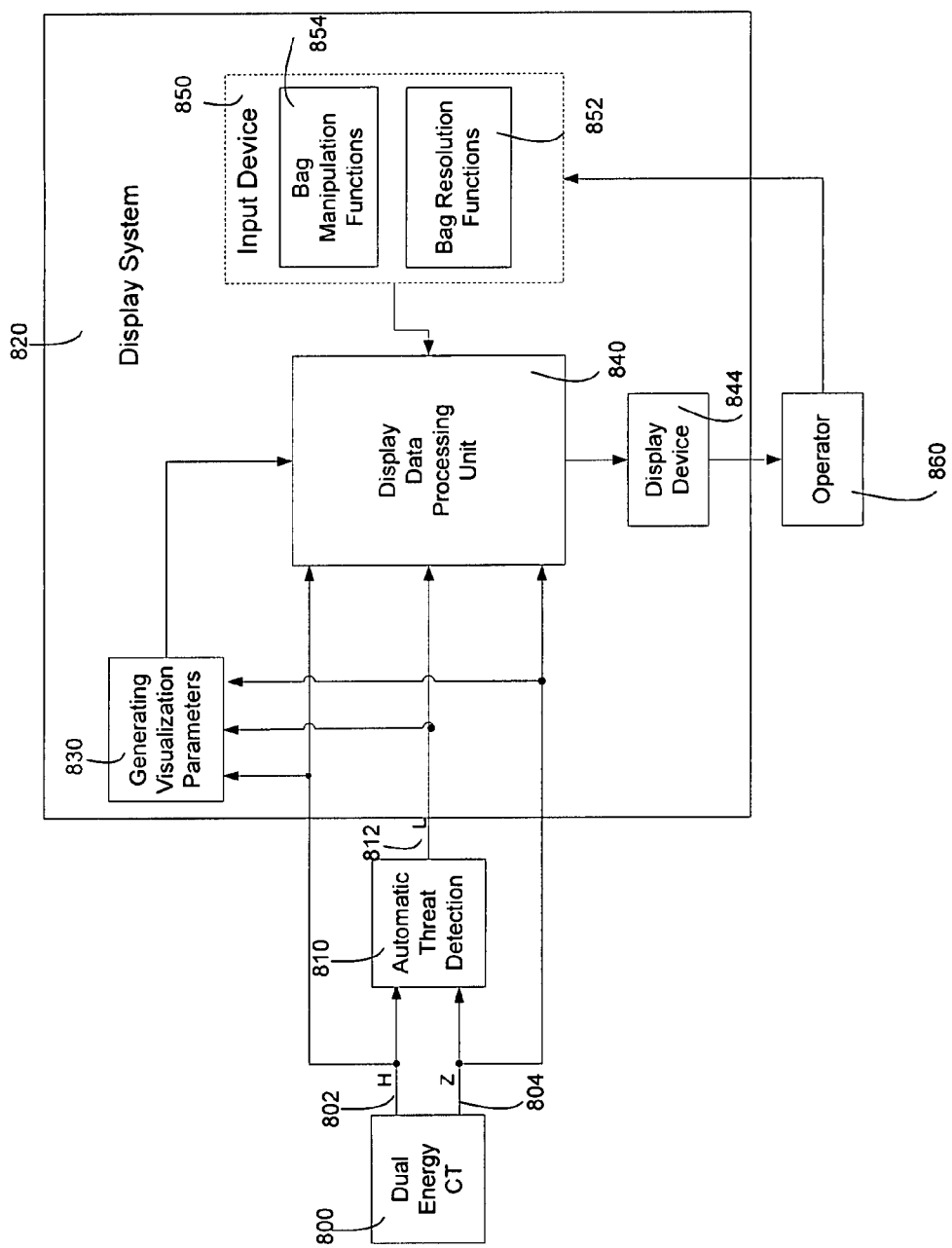
FIG. 7B contains a flow block diagram which illustrates the logical flow of an alternative embodiment of a system for automatic object display of volumetric multi-energy CT images for on-screen threat resolution in accordance with one aspect of the present disclosure.

In accordance with one aspect of the present disclosure, bag manipulation functions as described previously can still be used after the optimal display images are displayed to operators. FIG. 7B contains a flow diagram that illustrates the logical flow of one embodiment for automatic object display of volumetric multi-energy CT images with automatic threat detection results for fast on-screen threat resolution of the present disclosure. The multiple optimal display images are generated according to the visualization parameters generated by the visualization parameter generation unit 830, and are displayed to operators at once or in a sequence with a pre-determined interval. In some cases, operators may optionally want to manipulate images using the bag manipulation functions 854 for further understanding of the threat object.

Figure 8A:
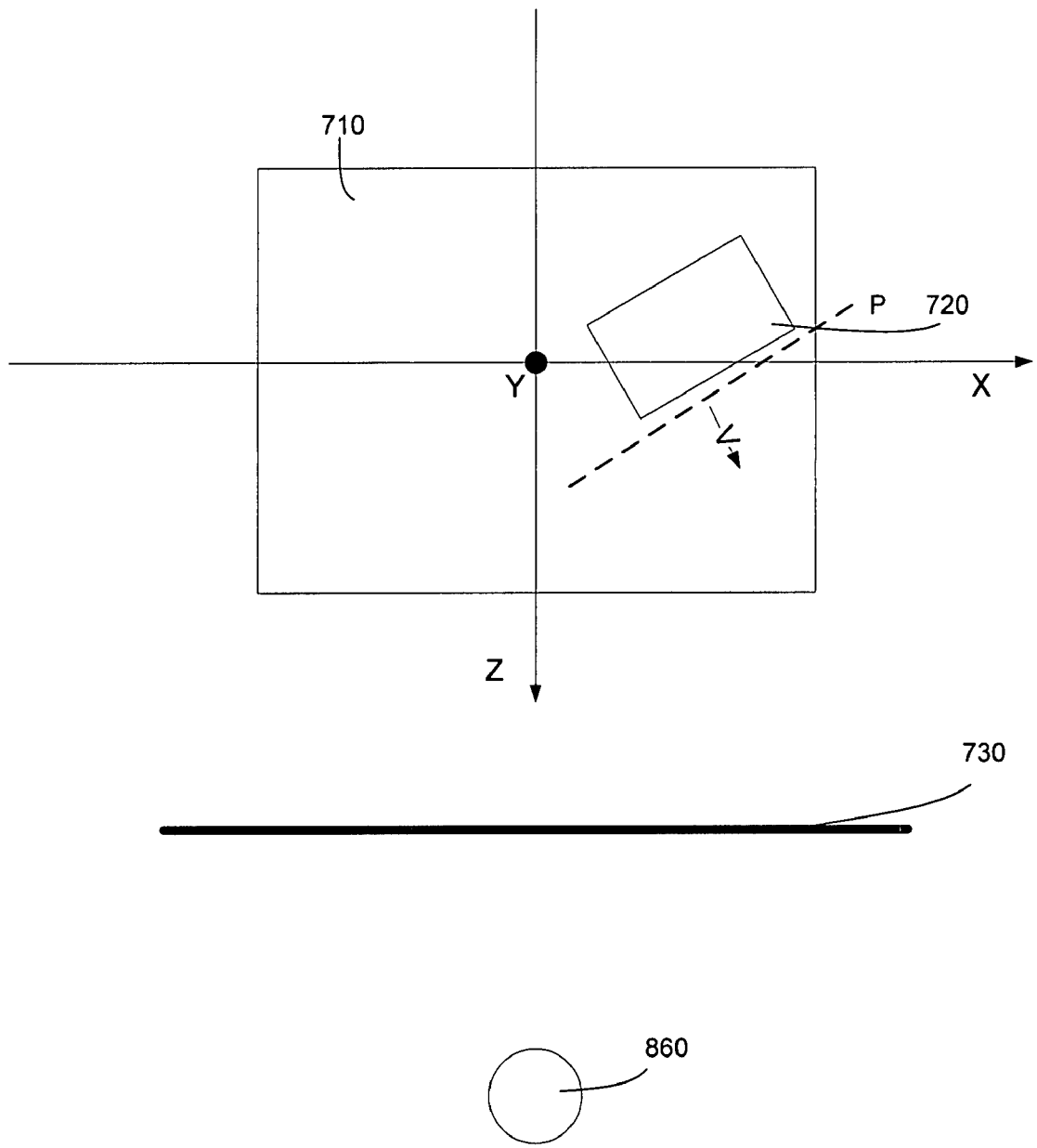
FIG. 8A illustrates a schematic of a 3D rendering display with an arbitrary orientation of a scanned bag.
Figure 8B:
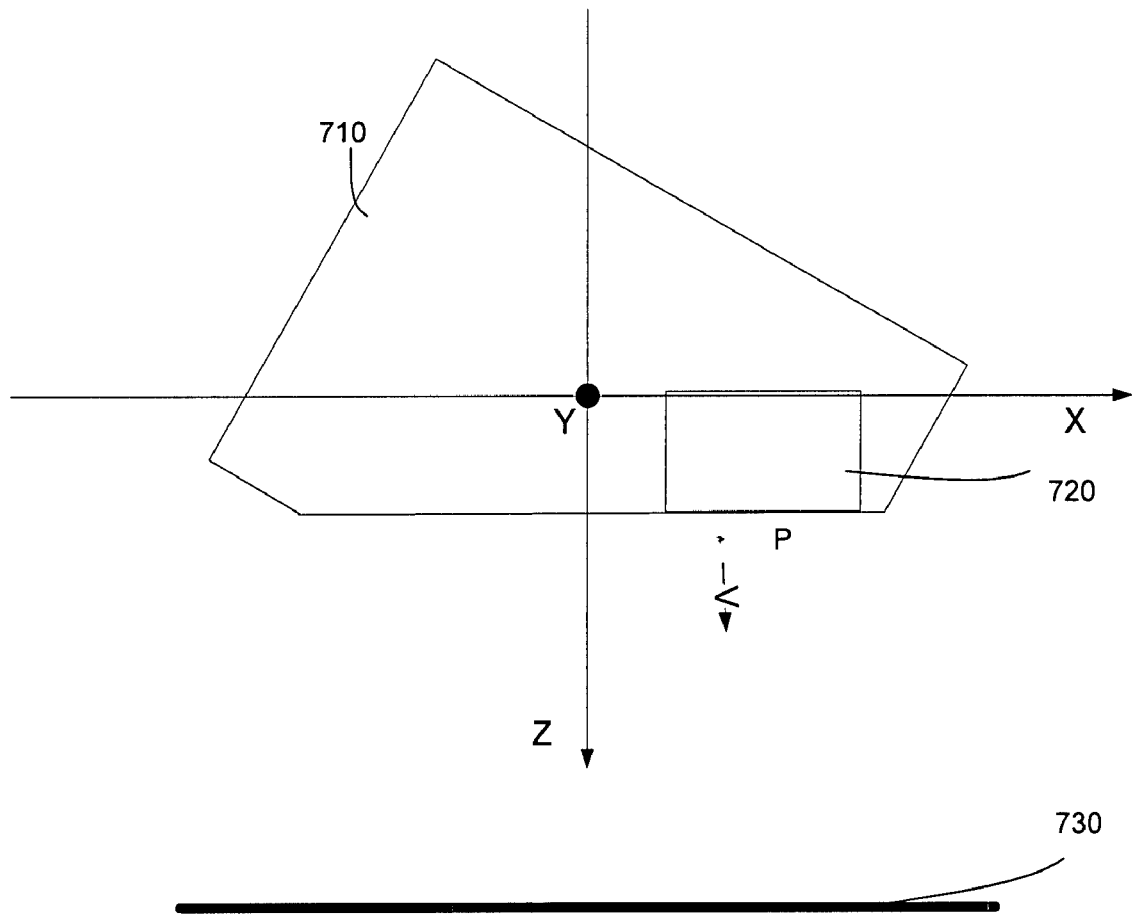
FIG. 8B illustrates the result of an optimally aligned and virtually opened bag.

FIG. 8A illustrates a schematic of rendering and displaying a scanned bag at an arbitrary orientation. The scanned bag 710 is contained in the 3D volumetric CT image data, and a threat object 720 is inside the bag 710. The scanned bag 710 containing the threat object 720 is rendered to a viewing plane 730 to an operator 860. The data processing unit comprises three steps of operation to display the bag according to the visualization parameters, which include at least an orientation vector and an opening plane with its normal vector being the orientation vector: A) rotating the bag according to the orientation vector to optimally align the selected threat object to operators; B) removing the front portion of the bag image according to the opening plane; C) rendering the optimally aligned virtually opened 3D bag into a display image. FIG. 8B shows the resulting bag image displayed on a display device.

While this disclosure has been particularly shown and described with references to preferred embodiments thereof, it will be understood by those skilled in the art that various changes in form and details may be made therein without departing from the spirit and scope of the disclosure as defined by the following claims. Such variations include using a CT image without a Z image for displaying and using a segmentation algorithm instead of an automatic threat detection algorithm for generating a label image.

The invention claimed is:

1. A method of generating an automatic object display of volumetric Computed Tomography (CT) data representing one or more objects and reconstructed from x-ray projection data acquired from x-ray detectors for on-screen threat resolution, wherein a label image defining each object as a plurality of voxels of said volumetric CT data is also provided, and wherein said label image contains at least one object, the method comprising:
    A. Processing said volumetric CT data and said label image and obtaining visualization parameters for each object, wherein the visualization parameters for each object include at least an opening plane and an orientation vector normal to the opening plane;
    B. Automatically generating at least one display image with respect to a selected object using the corresponding visualization parameters, wherein automatically generating at least one display image comprises (i) rotating the bag according to said orientation vector to optimally align the selected object to operators viewing the object display so as to define an optimally aligned and virtually opened 3D bag image, (ii) removing the front portion of the bag image according to said opening plane, and (iii) rendering the optimally aligned and virtually opened 3D bag image into a display image; and
    C. Displaying each automatically generated display image from Step B on a display device for on-screen threat resolution.

2. The method of claim 1, wherein said volumetric CT data include a CT image.

3. The method of claim 1, wherein said volumetric CT data include a CT image and a Z image.

4. The method of claim 1, further including generating said label image from an automatic threat detection algorithm using said volumetric CT data.

5. The method of claim 1, further including generating said label image from a segmentation algorithm using said volumetric CT data.

6. The method of claim 1, further including performing an eigen-analysis on the selected object so as to obtain said orientation vector.

7. The method of claim 1, wherein processing the volumetric CT data includes processing the volumetric CT data so that said orientation vector is the eigen-vector corresponding to the minimal eigen-value of the selected object.

8. The method of claim 1, wherein processing the volumetric CT data includes processing the volumetric CT data so that said orientation vector is the eigen-vector corresponding to the maximal eigen-value of the selected object.

9. The method of claim 1, wherein processing the volumetric CT data includes processing the volumetric CT data so that said orientation vector is the eigen-vector corresponding to the medium eigen-value of the selected object.

10. The method of claim 1, further including obtaining the orientation vector of the selected object as a function of a normal vector of a plane, onto which the selected threat object is projected so as to yield the maximal projection area.

11. The method of claim 1, further including obtaining the orientation vector of the selected object as a function of a normal vector of a plane, onto which the selected threat object is projected so as to yield the minimal projection area.

12. The method of claim 1, further including defining said opening plane as a front opening plane passing through the maximal extending point of the selected threat object along said orientation vector.

13. The method of claim 1, further including defining said opening plane as a mass center opening plane passing through the mass center of the selected object.

14. The method of claim 1, further including defining said opening plane as a geometric center opening plane passing through the geometric center of the selected object.

15. A system for generating an automatic object display of volumetric Computed Tomography (CT) data representing one or more objects and reconstructed from x-ray projection data acquired from x-ray detectors for on-screen threat resolution, wherein a label image defining each object as a plurality of voxels of said volumetric CT data is also provided, and wherein said label image contains at least one object, the system comprising:
    A. A visualization parameter generation unit constructed and arranged so as to process said volumetric CT data and said label image and obtain visualization parameters for each object, wherein the visualization parameters for each object include at least an opening plane and an orientation vector normal to the opening plane;

B. A display data processing unit constructed and arranged so as to automatically generate at least one display image with respect to a selected object using the corresponding visualization parameters, wherein said display data processing unit is constructed and arranged so as to (i) rotate the bag according to said orientation vector to optimally align the selected object to operators viewing the object display so as to define an optimally aligned and virtually opened 3D bag image, (ii) remove the front portion of the bag image according to said opening plane; and (iii) render the optimally aligned and virtually opened 3D bag into a display image; and C. A display device constructed and arranged so as to display each automatically generated display image for on-screen threat resolution.

16. The system of claim 15, wherein said volumetric CT data include a CT image.

17. The system of claim 15, wherein said volumetric CT data include a CT image and a Z image.

18. The system of claim 15, further including an automatic threat detection algorithm utilizing volumetric CT data so as to generate said label image.

19. The system of claim 15, further including a segmentation algorithm utilizing volumetric CT data so as to generate said label image.

20. The system of claim 15, wherein said visualization parameter generation unit is constructed and arranged so as to obtain said orientation vector from performing an eigen-analysis on the selected object.

21. The system of claim 15, wherein said visualization parameter generation unit is constructed and arranged so as to generate said orientation vector by using the eigen-vector corresponding to the minimal eigen-value of the selected object.

22. The system of claim 15, wherein said visualization parameter generation unit is constructed and arranged so as to generate said orientation vector by using the eigen-vector corresponding to the maximal eigen-value of the selected object.

23. The system of claim 15, wherein said visualization parameter generation unit is constructed and arranged so as to generate said orientation vector by using the eigen-vector corresponding to the medium eigen-value of the selected object.

24. The system of claim 15, wherein said visualization parameter generation unit is constructed and arranged so as to generate said orientation vector by using a normal vector of a plane onto which the selected threat object is projected so as to yield the maximal projection area.

25. The system of claim 15, wherein said visualization parameter generation unit is constructed and arranged so as to generate said orientation vector by using a normal vector of a plane onto which the selected threat object is projected so as to yield the minimal projection area.

26. The system of claim 15, wherein said visualization parameter generation unit is constructed and arranged so as to generate said opening plane by using a front opening plane passing through the maximal extending point of the selected object along said orientation vector.

27. The system of claim 15, wherein said visualization parameter generation unit is constructed and arranged so as to generate said opening plane by using a mass center opening plane passing through the mass center of the selected object.

28. The system of claim 15, wherein said visualization parameter generation unit is constructed and arranged so as to generate said opening plane by using a geometric center opening plane passing through the geometric center of the selected object.

* * * * *